United States Patent
Shibuhisa et al.

(10) Patent No.: US 9,729,844 B2
(45) Date of Patent: Aug. 8, 2017

(54) IMAGE CAPTURING DEVICE, IMAGE DISPLAY METHOD, AND RECORDING MEDIUM

(71) Applicant: Sharp Kabushiki Kaisha, Osaka-shi, Osaka (JP)

(72) Inventors: Nao Shibuhisa, Osaka (JP); Kei Tokui, Osaka (JP); Yasutaka Wakabayashi, Osaka (JP); Shinichi Arita, Osaka (JP); Daisuke Murayama, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 88 days.

(21) Appl. No.: 14/390,449

(22) PCT Filed: Apr. 3, 2013

(86) PCT No.: PCT/JP2013/060159
§ 371 (c)(1),
(2) Date: Oct. 3, 2014

(87) PCT Pub. No.: WO2013/151076
PCT Pub. Date: Oct. 10, 2013

(65) Prior Publication Data
US 2015/0042756 A1 Feb. 12, 2015

(30) Foreign Application Priority Data

Apr. 4, 2012 (JP) .................. 2012-085735

(51) Int. Cl.
*G01B 11/02* (2006.01)
*H04N 13/00* (2006.01)
(Continued)

(52) U.S. Cl.
CPC ......... *H04N 13/0022* (2013.01); *G01B 11/02* (2013.01); *H04N 13/0203* (2013.01);
(Continued)

(58) Field of Classification Search
CPC ...................... H04N 13/0022; H04N 13/0203
See application file for complete search history.

(56) References Cited

U.S. PATENT DOCUMENTS

2009/0148038 A1 6/2009 Sawachi
2010/0299109 A1* 11/2010 Saito .................. B60W 40/072
703/1
(Continued)

FOREIGN PATENT DOCUMENTS

JP 11-102007 A 4/1999
JP 2004-064504 A 2/2004
(Continued)

OTHER PUBLICATIONS

Official Communication issued in International Patent Application No. PCT/JP2013/060159, mailed on Jun. 25, 2013.

*Primary Examiner* — Christopher Findley
(74) *Attorney, Agent, or Firm* — Keating & Bennett, LLP

(57) ABSTRACT

In the related art, it was difficult to compare lengths of a plurality of objects which were present at different places. However, it is possible to easily compare lengths of photographed objects using an image capturing device which displays a length of an object which is calculated based on parallax information, by obtaining an image in which the object is photographed and the parallax information corresponding to the image as inputs, the device including an object extraction unit which extracts an image of an object using the parallax information from the photographed image; a comparison data maintaining unit which maintains the image of the object and the length of the object; an object comparison unit which compares the length of the object which is extracted using the object extraction unit to a length of comparison data which is extracted from the comparison data maintaining unit; and an image composition unit which
(Continued)

combines a comparison result with the photographed image, and outputs the image.

8 Claims, 11 Drawing Sheets

(51) Int. Cl.
*H04N 13/02* (2006.01)
*H04N 13/04* (2006.01)
*G06F 3/14* (2006.01)

(52) U.S. Cl.
CPC ......... *H04N 13/0239* (2013.01); *H04N 13/04* (2013.01); *G06F 3/14* (2013.01); *H04N 2013/0074* (2013.01); *H04N 2013/0092* (2013.01)

(56) References Cited

U.S. PATENT DOCUMENTS

| | | | |
|---|---|---|---|
| 2011/0249117 A1* | 10/2011 | Yoshihama | G06T 7/0075 348/135 |
| 2012/0224069 A1* | 9/2012 | Aoki | G01B 11/026 348/187 |

FOREIGN PATENT DOCUMENTS

| | | |
|---|---|---|
| JP | 2006-74460 A | 3/2006 |
| JP | 2009-162747 A | 7/2009 |
| JP | 2010-147940 A | 7/2010 |
| JP | 2011-153995 A | 8/2011 |
| JP | 2011-232330 A | 11/2011 |

* cited by examiner

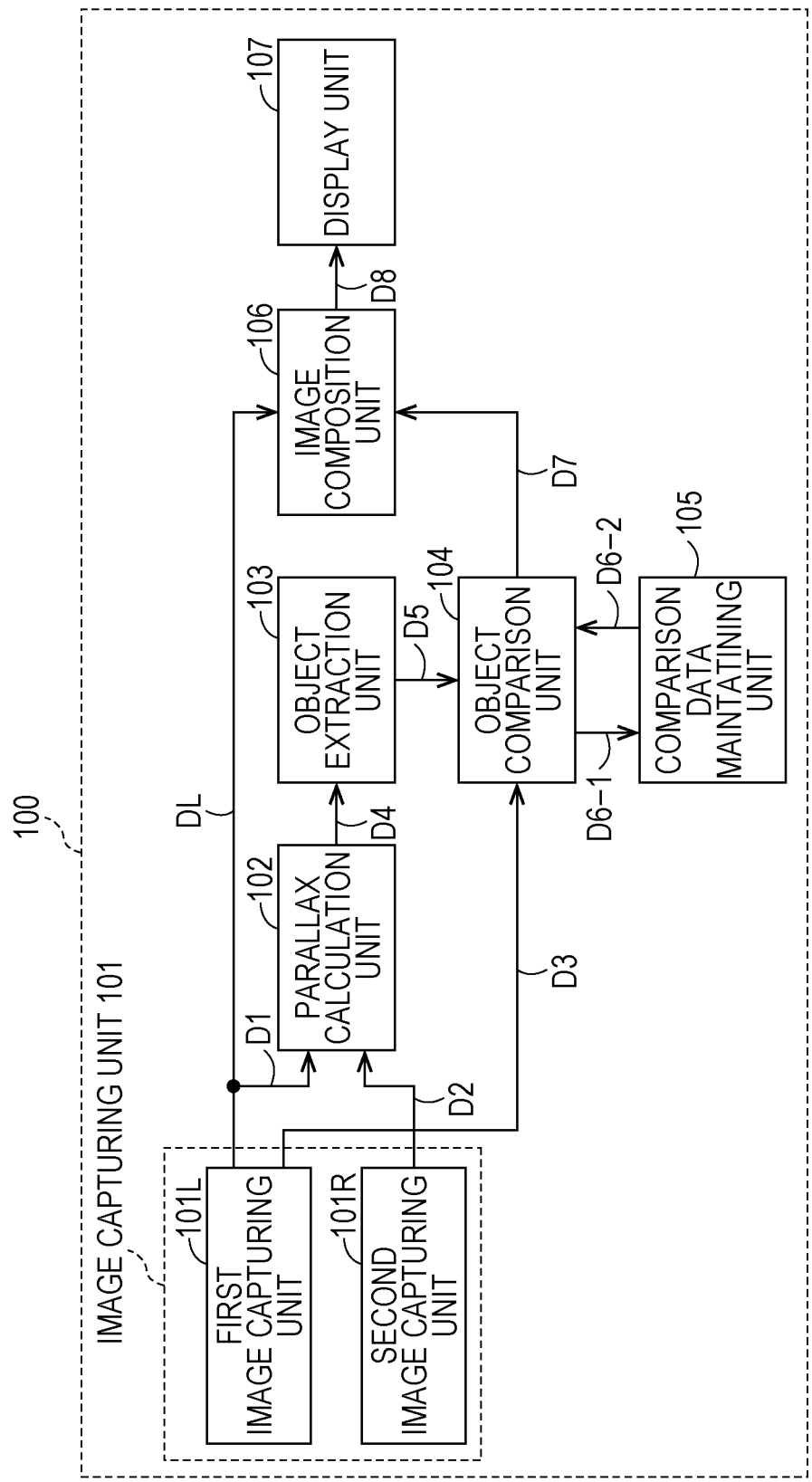

(a)
IMAGE (b)
PARALLAX IMAGE (a) PATTERN 1

(b) PATTERN 2

(c) PATTERN 3

IMAGE CAPTURING DEVICE, IMAGE DISPLAY METHOD, AND RECORDING MEDIUM

TECHNICAL FIELD

The present invention is related to an image capturing device in which the length of a photographed object is displayed by being converted into the length of comparison data.

BACKGROUND ART

A method of taking a stereoscopic image using an image capturing device which includes a plurality of capturing units is known. In a stereoscopic image which is obtained by the capturing device, stereopsis can be performed by displaying a left eye image for the left eye, and a right eye image for the right eye of a viewer, respectively, in a stereoscopic display apparatus. This method is a method in which parallax which occurs between images which are obtained by photographing the same object from different viewpoint positions is used. It is possible to measure a distance to an object using triangulation when the parallax, a distance between two viewpoint positions which are photographed by the image capturing device, and camera parameters of the image capturing device are known. For example, in PTL 1 which is described below, a method of measuring the length between two designated points on an object using a stereo camera is disclosed.

CITATION LIST

Patent Literature

PTL 1: Japanese Unexamined Patent Application Publication No. 2011-232330

SUMMARY OF INVENTION

Technical Problem

However, in the above described display method, it is possible to measure the length between two points on an object which are designated by a user, however, it is difficult to compare the lengths of a plurality of objects which are present at different locations.

The present invention has been made in order to solve the above described problem, and an object thereof is to provide an image capturing device in which the lengths of photographed objects can be easily compared.

Solution to Problem

The present invention includes the following technical means in order to solve the above described problem.

An image capturing device displays a length of an object which is calculated based on parallax information, by obtaining an image in which the object is photographed and the parallax information corresponding to the image as inputs, the device including an object extraction unit which extracts an image of an object using the parallax information from the photographed image; a comparison data maintaining unit which maintains the image of the object and the length of the object; an object comparison unit which compares the length of the object which is extracted using the object extraction unit to a length of comparison data which is extracted from the comparison data maintaining unit; and an image composition unit which combines a comparison result with the photographed image, and outputs the image.

Further, an image capturing device displays a length of an object which is calculated based on distance information, by obtaining an image in which the object is photographed and the distance information corresponding to the image as inputs, the device including an object extraction unit which extracts an object from the photographed image using the distance information; a comparison data maintaining unit which maintains an image of the object and a length of the object; an object comparison unit which compares the length of the object which is extracted using the object extraction unit to a length of comparison data which is extracted from the comparison data maintaining unit; and an image composition unit which combines a comparison result with the photographed image, and outputs the image.

The object comparison unit may preferably include a length calculation unit which calculates length magnification, and the image composition unit may preferably use at least one of characters or an image as the length magnification.

The image composition unit may change an image resolution of the comparison data so that the length of the object and a length of the comparison data match each other, may copy an image of the comparison data based on the length magnification, and may display the copied comparison data in line.

The length magnification may be a ratio of the length of the object to the length of the comparison data.

The length of the object may be calculated from a mean value of parallax corresponding to an object included in an arbitrary frame which has the same center of gravity as the image.

The object comparison unit may first display comparison data which is short in length as a candidate of comparison data, among comparison data which are maintained in the comparison data maintaining unit.

Further, the present invention is an image display method in which a length of an object which is calculated based on parallax information is displayed, by obtaining an image in which the object is photographed and the parallax information corresponding to the image as inputs, the method including an object extracting step in which an image of an object is extracted from the photographed image using the parallax information; an object comparing step in which a length of the object which is extracted in the object extracting step is compared to a length of comparison data which is extracted from comparison data maintaining unit which maintains the image of the object and the length of the object; and an image combining step in which a comparison result is combined with the photographed image, and the image is output.

The present invention may be a program for causing a computer to execute the above described image display method, or may be a computer-readable recording medium which records the program.

Advantageous Effects of Invention

According to the image capturing device of the present invention, it is possible to easily compare the lengths of photographed objects.

BRIEF DESCRIPTION OF DRAWINGS

FIG. 1A is a functional block diagram which illustrates one configuration example of an image capturing device according to an embodiment of the present invention.

DESCRIPTION OF EMBODIMENTS

Figure 1B:
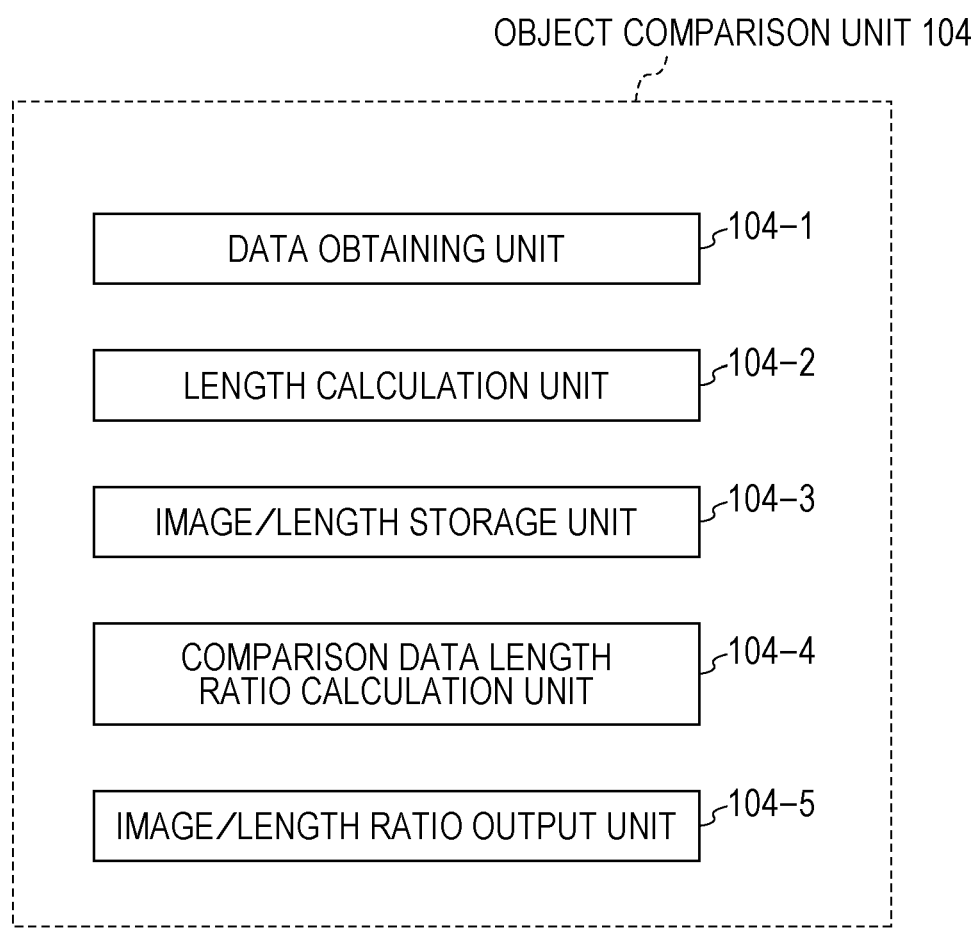
FIG. 1B is a functional block diagram which illustrates one configuration example of an object comparison unit.

Hereinafter, an embodiment of the present invention will be described in detail using drawings. In addition, a configuration in each figure is described by being exaggerated for ease of understanding, and is different from actual intervals or dimensions.

Embodiment

FIG. 1A is a functional block diagram which illustrates one configuration example of an image capturing device according to an embodiment of the present invention. An image capturing device 100 according to the embodiment includes an image capturing unit 101, a parallax calculation unit 102, an object extraction unit 103, an object comparison unit 104, a comparison data maintaining unit 105, an image composition unit 106, and a display unit 107.

The image capturing unit 101 includes at least a first image capturing unit 101L and a second image capturing unit 101R, obtains a right eye image and a left eye image, respectively, and carries out a capturing function due to inclusion of a capturing element such as a capturing lens, and a Charge Coupled Device (CCD). From the image capturing unit 101, a left eye image D1 and a right eye image D2 are output to the parallax calculation unit 102, and a base line length Lb [m] which is an interval between the image capturing units 101L and 101R, and camera parameters are output to the object comparison unit 104 (D3). Here, the camera parameters are a focal distance Lf [m] of the image capturing unit 101L, a pixel pitch p [pixels/m] of the image capturing unit 101L, a vertical angle of view θ (degrees), and a vertical resolution h [pixels] of an image.

Figure 2:
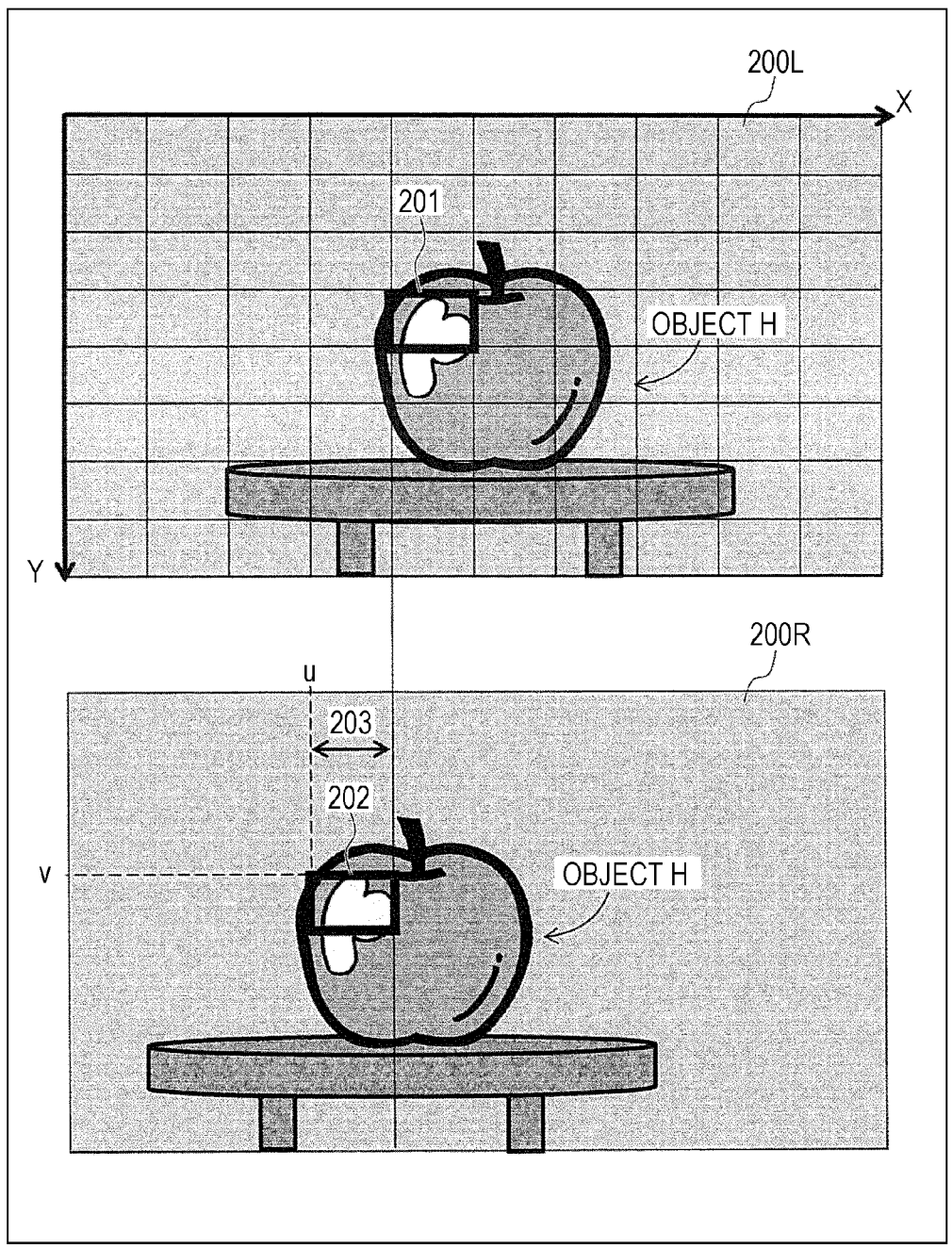
FIG. 2 is a diagram which describes a parallax calculation method.

In the parallax calculation unit 102, parallax is calculated from the left eye image and the right eye image. Hereinafter, an example of a parallax calculation method based on a left eye image will be described. A left eye image is divided into small windows, that is, into templates. FIG. 2 illustrates a left eye image 200 which is divided into templates. A corresponding position on a right eye image 200R with respect to each of the windows is retrieved. That is, as illustrated in FIG. 2, a template 201 of the left eye image 200L is overlapped with a position of points (u, v) of the right eye image 200R, and a degree of difference S between the template 201 and a partial pattern 202 of an overlapped image in the right eye image is calculated. For example, as the following expression, the degree of difference S can be denoted by a sum of absolute values of differences between overlapped pixels of the template 201 of the left eye image 200L and a partial pattern 202 of the right eye image 200R.

[Equation 1]

$$S = \sum_{i,j \in T} |L(x_1 + i, y_1 + j) - R(u + i, v + j)| \quad (1)$$

Here, L(x, y) denotes a pixel value in (x, y) coordinates of the left eye image, and R(u, v) denotes a pixel value in (u, v) coordinates of the right eye image. T denotes a size of the template. The degree of difference S denotes a degree of certainty that there is a target in the point (u, v), and when the value S is smaller, it denotes that there may be the target. When obtaining a position of a target, a position at which the degree of difference becomes a certain threshold value or less may be retrieved by performing this operation with respect to all points on an image. A difference 203 in a position of a target between the left eye image 200L and the right eye image 200R becomes parallax of the target. By performing the above described processing, it is possible to calculate parallax based on the left eye image.

Figure 3:
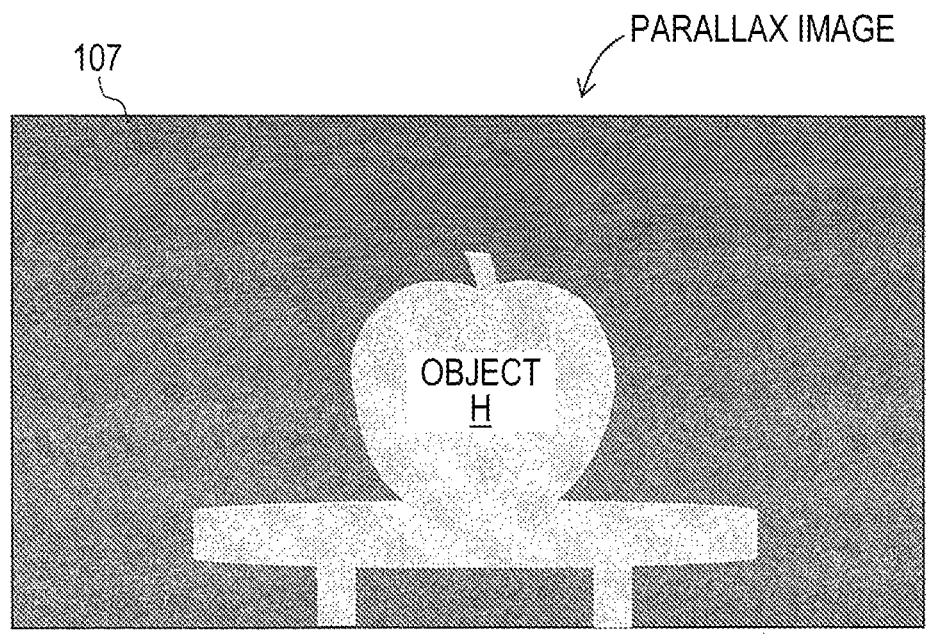
FIG. 3 is a diagram which describes parallax.

A parallax image illustrated in FIG. 3 is an image in which parallax is stored in each pixel by causing the parallax to corresponding to pixels of an object, and a parallax value of an object H is denoted by a luminance value. When an object is close to the image capturing device, a parallax value becomes large, and when an object is far from the image capturing device, the parallax value becomes small, and here, when the parallax value is larger, the object is denoted by brighter pixels, and when the parallax value is smaller, the object is denoted by darker pixels.

Figure 4:
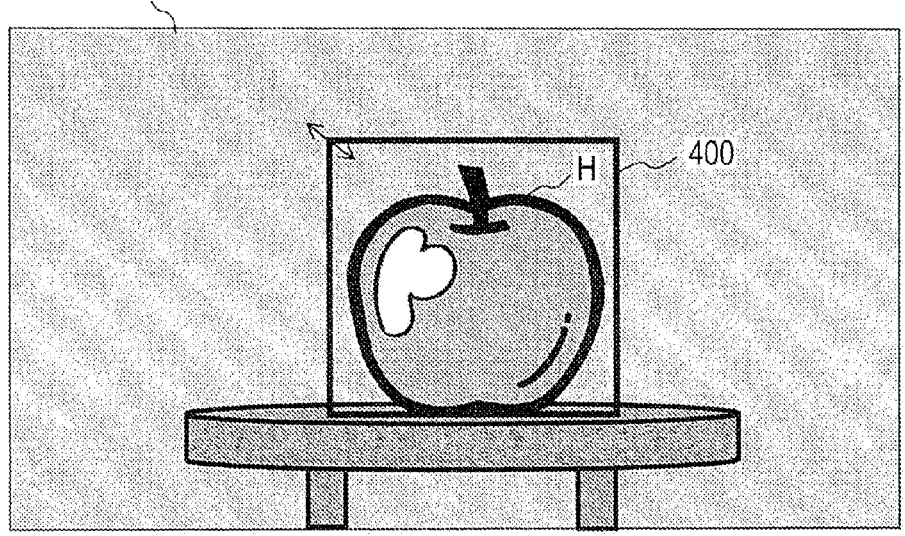
FIG. 4 is a diagram which describes an extraction of an object.
Figure 4:
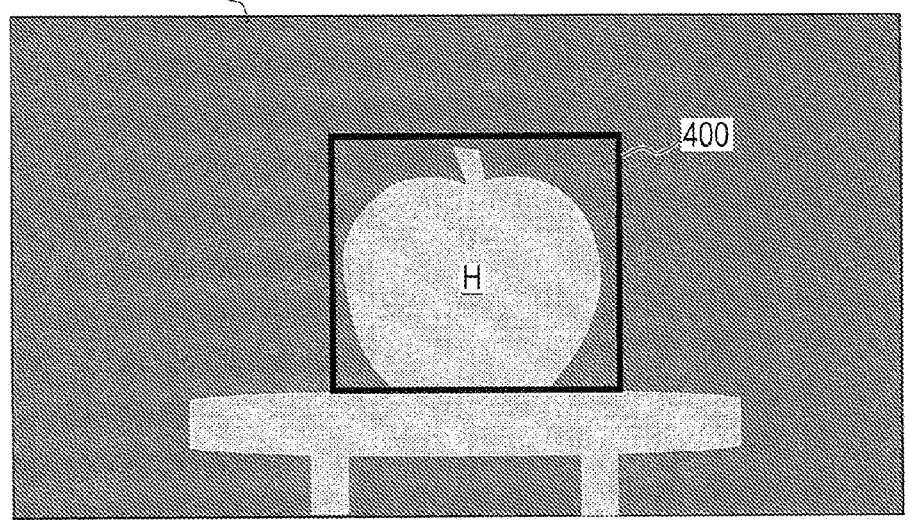

Parallax and a left eye image (D4) which are calculated in the parallax calculation unit 102 are sent to the object extraction unit 103. In the object extraction unit 103, an object of which the length is desired to be measured is extracted from the left eye image. The object becomes an object for comparison. Specifically, an object H in a frame 400 which is illustrated in FIG. 4(a) is extracted as the object for comparison. The frame 400 is displayed on a preview screen when an image of an object is captured by the image capturing unit 101, and a user performs photographing so that the object H is circumscribed by the frame 400. A size of the frame 400 can be operated using an external input device which is not illustrated. That is, it is possible for a user to set an aspect ratio or a size of an image to an arbitrary value (refer to arrow).

Figure 5:
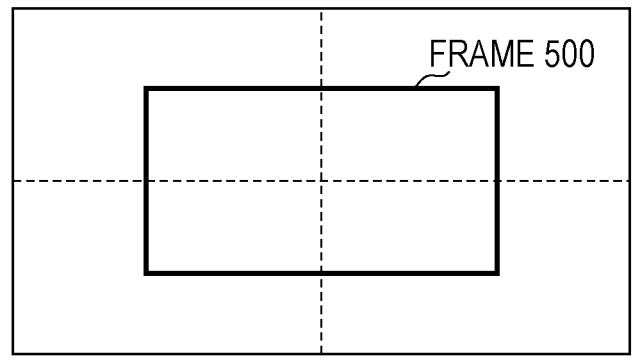
FIG. 5 is a diagram which describes an example of a pattern of a frame for extracting an object.
Figure 5:
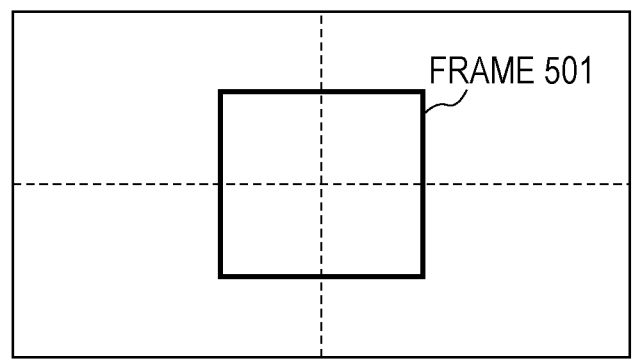
Figure 5:
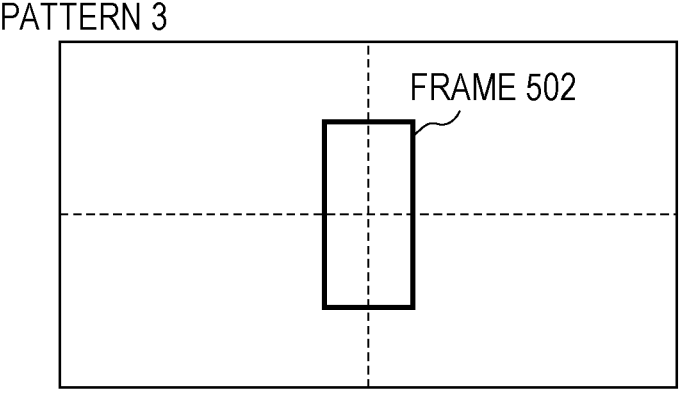

For example, it is preferable that a center of gravity of the frame be set so as to be a center of a screen, a size of a frame be set to a frame 500 (pattern 1), a frame 501 (pattern 2), and a frame 502 (pattern 3), as illustrated in FIGS. 5(a), 5(b), and 5(c), and a user perform an operation of switching these three patterns, since an operation of a user becomes simple. In addition, it is possible to exclude most of regions other than the object H from a processing target by applying a frame, however, there is a background image other than the object H in the frame. Therefore, it is preferable that an object and a background be separated using parallax, since there is no sense of unease in composition in the image composition unit 106. At this time, a parallax value of an object may be extracted by analyzing a parallax histogram in the frame, and a parallax value of a point on a display which is touched by a user using an external input device (not illustrated) may be set to a parallax value of an object. An object image D5 which is extracted using the above described processing is output to the object comparison unit 104.

In the object comparison unit 104, the length of the object H is calculated using the object image D5, the base line length, and the camera parameters (D3), and the object image and the length are output to the comparison data maintaining unit 105 (D6-1). In addition, a length magnification A of the object to be compared which is input from the comparison data maintaining unit 105, and the comparison data (D6-2) is calculated, and the comparison data and the length magnification A are output to the image composition unit 106 (D7).

First, the length of the object is calculated using the object image, the base line length, and the camera parameters. A relationship between a representative parallax d [pixel] of the object and the distance Z [m] becomes the following expression.

[Equation 2]

$$Z = \frac{L_b L_f}{dp} \qquad (2)$$

The representative parallax d of the object is a mean value of parallax of the object. When the parallax of the object is uneven, it is preferable to decide the representative parallax in this manner, since it becomes easy to calculate. The length $L_o$ of the object is denoted in the following expression.

[Equation 3]

$$L_o = \frac{h_o}{h} 2Z\tan\theta \qquad (3)$$

Figure 6:
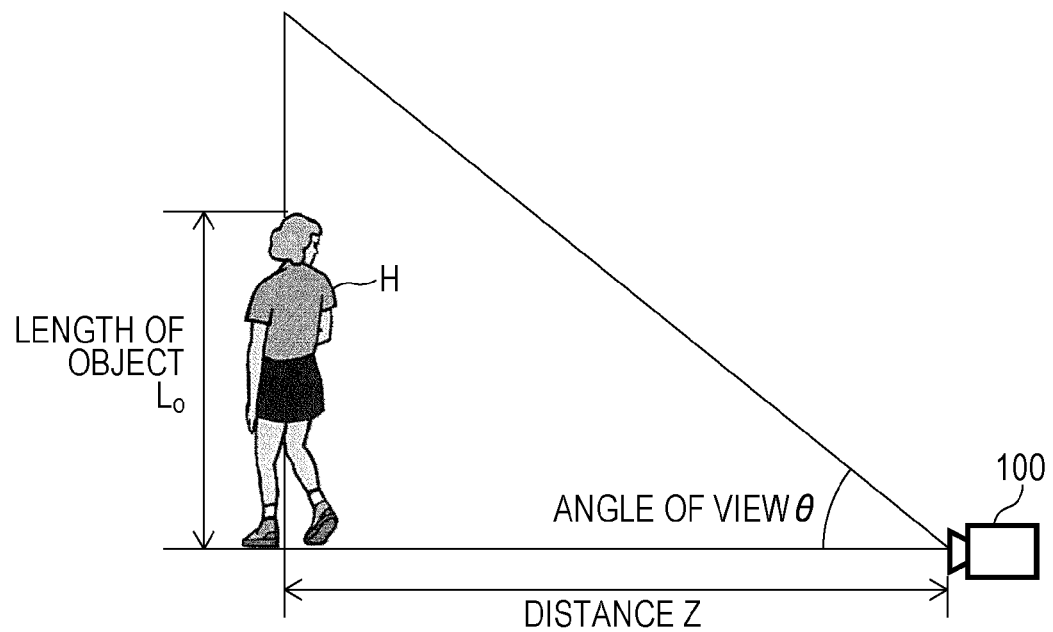
FIG. 6 is a diagram which describes a positional relationship between a capturing device and an object.
Figure 7:
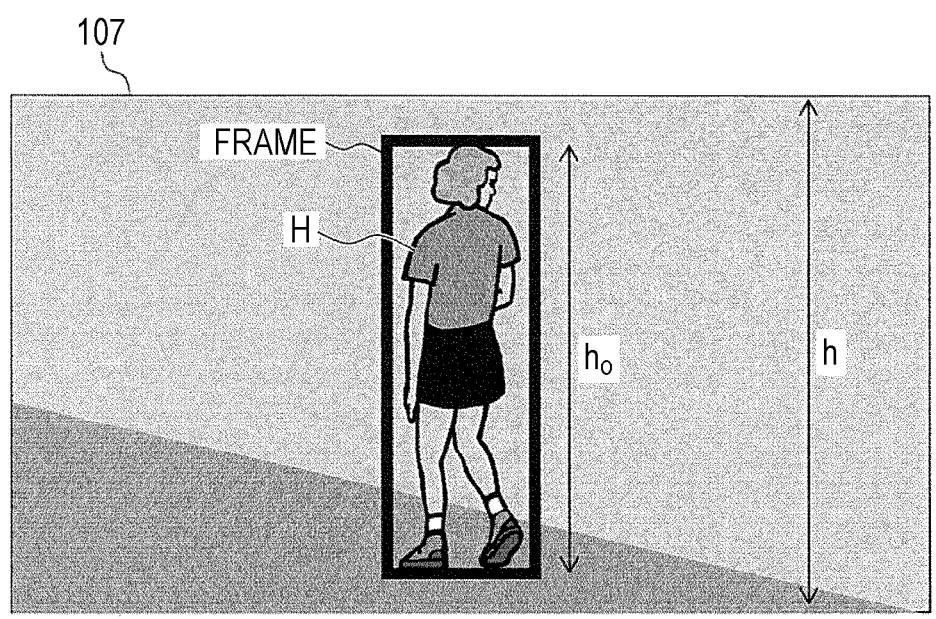
FIG. 7 is a diagram which describes a method of calculating the length of an object.

Here, $h_o$ denotes the number of pixels in the y axis direction of the object, h denotes a vertical resolution of a photographed image, and θ denotes an angle of view in the orthogonal direction. FIGS. 6 and 7 illustrate parameters which are used in order to calculate the object length $L_o$. The object length $L_o$ which is calculated using the above described processing, and the object image are output to the comparison data maintaining unit 105 (above described D6-1).

Subsequently, the length magnification A of the object and the comparison data is calculated. The length magnification A is a value which denotes that the length of an object for comparison which is the object is A times the length of the comparison data. The comparison data is maintained in the comparison data maintaining unit 105. The comparison data and the length $L_c$ of the comparison data are obtained from the comparison data maintaining unit 105 (above described D6-2). At this time, a list of image candidates of comparison data which is maintained in the comparison data maintaining unit 105 is displayed on the preview screen along with the left eye image, and it is preferable for a user to select comparison data using an external input device (not illustrated), or the like, since visibility of the user improves. In addition, it is preferable that candidates of comparison data be sorted using the length of the comparison data, since it is easy for the user to retrieve the comparison data. That is, the comparison data which is stored in maintained order is displayed by being switched and aligned in order of the length of the comparison data.

Figure 8:
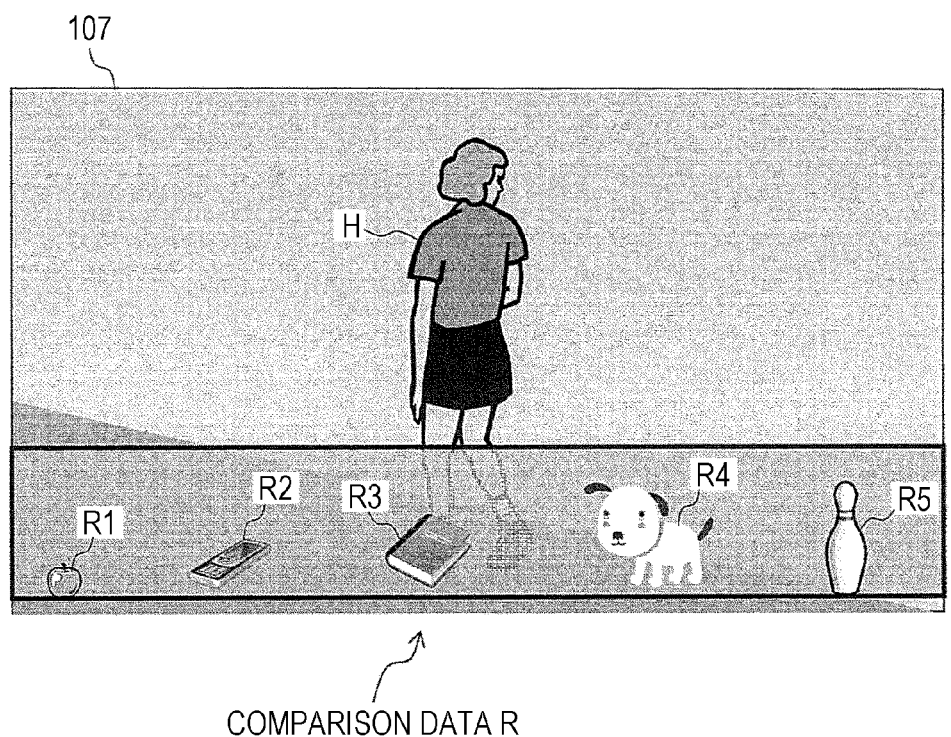
FIG. 8 is a diagram which describes a display method of a comparison data candidate.

FIG. 8 illustrates a state in which comparison data R is aligned in order from short comparison data. As illustrated in FIG. 8, it is preferable that a scale of the length of the comparison data be displayed so as to be matched between the candidates of comparison data (R1 to R5), since it is possible for the user to grasp the length intuitively. In addition, it is preferable that the selected comparison data R be the same even when the object is changed, since it is possible to display the length of the object H which is dynamically changed using the length magnification of the selected comparison data, and it is possible for the user to easily grasp the length of the object.

The length of the object H is the same regardless of the position of the image capturing device, however, since the length of the object H which is present in a fixed frame on a screen in the object extraction unit 103 is measured, the length of the object which is included in the frame is changed due to the positional relationship between the object and the image capturing device, even when the same object is photographed in the same frame. That is, when the object is separated from the image capturing device, it is possible to measure the whole length of the object in the fixed frame, and it is possible to measure a part of length of the object in the fixed frame, when the object comes close to the image capturing device.

It is possible to let the user easily know the change by displaying the change using the same comparison data. It is possible to calculate the length magnification A in the following expression using the length $L_c$ of the comparison data which is obtained as described above.

[Equation 4]

$$A = \frac{L_o}{L_c} \qquad (4)$$

The length magnification denotes that the object is larger than the comparison data by A times. It is possible to execute an object comparison display in which a user can easily compare the length of the object intuitively, in the subsequent image composition unit 106, using the length magnification.

FIG. 1B is a functional block diagram which illustrates one configuration example of the object comparison unit 104. As illustrated in FIG. 1B, the object comparison unit 104 includes a data obtaining unit 104-1, a length calculation unit 104-2, an image/length maintaining unit 104-3, a comparison data length ratio calculation unit 104-4, and an image/length ratio output unit 104-5.

Figure 9:
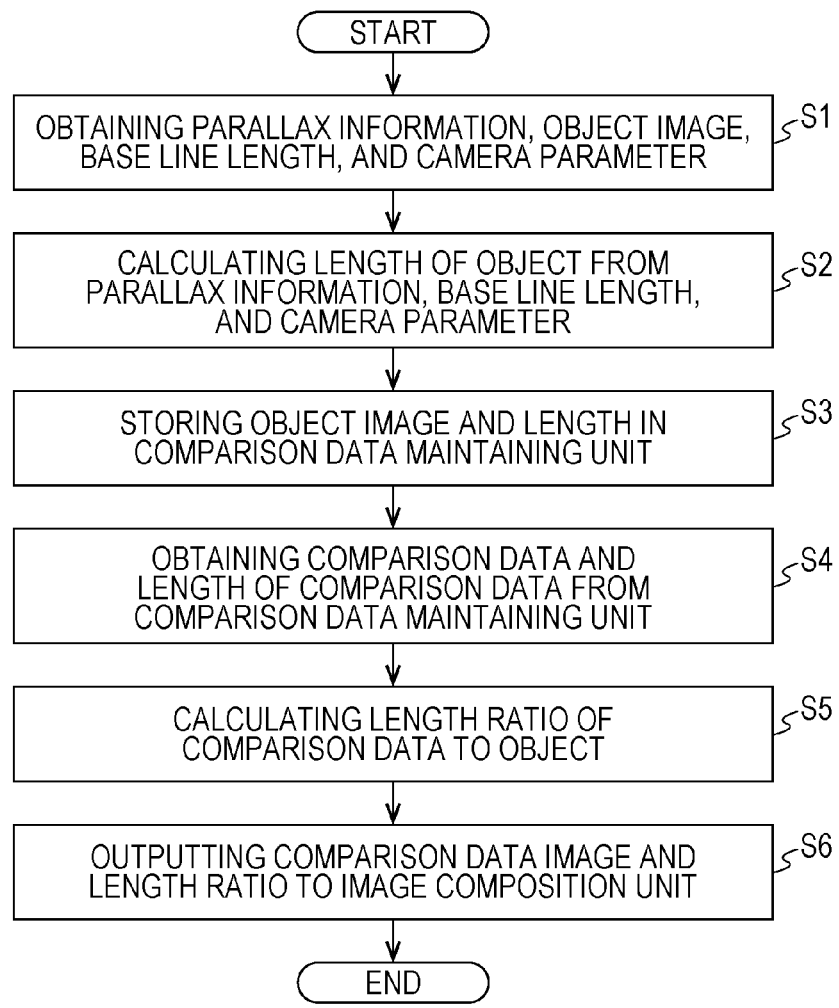
FIG. 9 is a flowchart which illustrates an example of an image processing procedure of an object comparison unit.

FIG. 9 is a flowchart which illustrates an example of a procedure of the object comparison unit 104. The data obtaining unit 104-1 of the object comparison unit 104 obtains parallax information and an object image from the object extraction unit 103, obtains the base line length and camera parameters from the image capturing unit 101 (S1), and the length calculation unit 104-2 calculates the length Lo of the object using the above described expressions (2) and (3) from the parallax information, the base line length, and the camera parameters (S2). Subsequently, the image/length maintaining unit 104-3 maintains the object image and the length in the comparison data maintaining unit 105 (S3). It is possible to use the object as comparison data by maintaining the photographed object, and the length in the comparison data maintaining unit 105. In addition, the comparison data and the length Lc of the comparison data are obtained from the comparison data maintaining unit 105 (S4), and the comparison data length ratio calculation unit 104-4 calculates the length magnification A of the comparison data with respect to the object using the expression (4) (S5). Subsequently, the image/length ratio output unit 104-5 outputs an image of the comparison data and the length magnification A to the image composition unit 106, and processing of the object comparison unit 104 is ended (S6).

Figure 10:
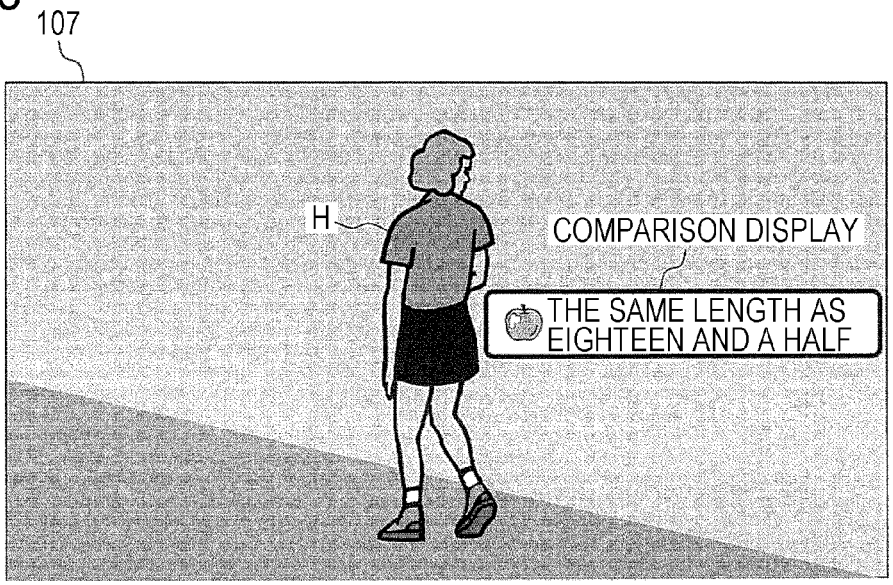
FIG. 10 is a diagram which describes a first example of a method in which the length of an object is displayed using the length of comparison data.

In the image composition unit 106, an image which is formed by converting the comparison data image based on the length magnification A is overlapped with the left eye image. Specifically, as illustrated in FIG. 10, the fact that the object H is longer than the comparison data by A times is displayed using an image, characters, or the like. At this time, it is preferable that a type and a manner of counting the object H be correlated with each other, since it is easy for a user to grasp a length comparison when being displayed using characters. For example, when the comparison data is an "apple", it is counted as A "apples". When the comparison data is a mobile phone, it is counted as A "phones". When the comparison data is a "book", it is counted as A "volumes". When the comparison data is an "animal" such as a "dog", it is counted as A "dogs". In addition, when a face of a human is detected, the comparison data is set to a "human", and it is counted as A "persons". When a percentage of a detected face of a human in the frame is large, it is preferable to set the comparison data to a "human face", and count as A "heads", since it is possible to simply grasp a size of head with respect to a whole body of a human. In a determination method of the "whole body of human" and the "human face", for example, it is possible to use a method in which, when a percentage of an area of the detected human face is equal to or greater than 80% of an area in the frame, it is determined to be the "human face".

When being comparison data of which a manner of counting is unclear, it is preferable not to display the manner of counting, by displaying, for example, "longer by A times than oo", since there is no sense of unease. In addition, when knowing an approximate length is enough, a method of displaying a value of decimal point or less is changed to a display method such as "A and a half", or "a little longer than A". Specifically, when setting a value of the length magnification A which is rounded off to two decimal points to A', if a value B which is obtained by subtracting A from A' is 0<B<0.4, it is "a little longer than A", if the value is 0.4≤B<0.6, it is "the same length as A and a half", and if the value is 0.6≤B<1.0, it is "a little shorter than A+1". In addition, it may be an expression of "a little smaller than A" by rounding up the number of decimal points, and of "larger than A" by rounding down the number of decimal points.

Figure 11:
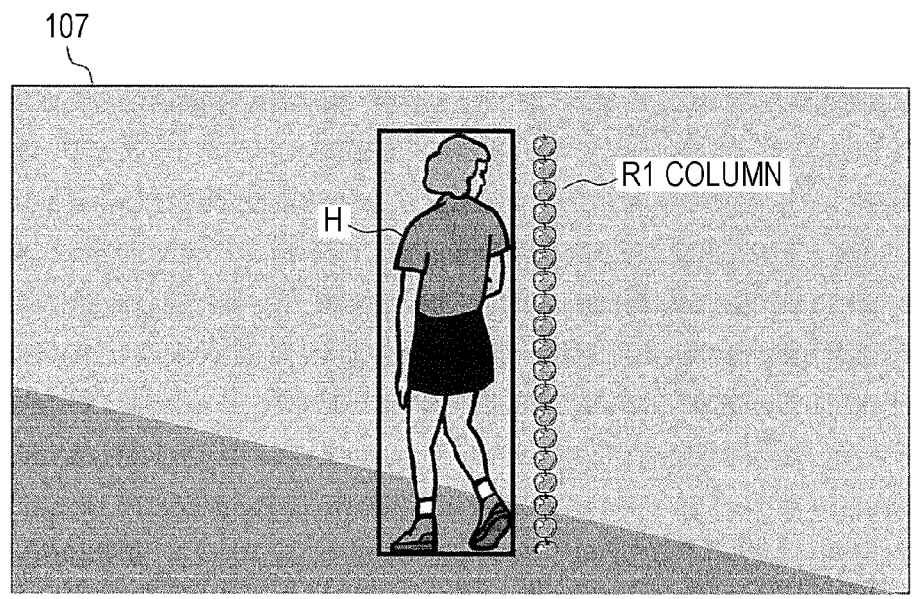
FIG. 11 is a diagram which describes a second example of a method in which the length of an object is displayed using the length of comparison data.

In addition, as illustrated in FIG. 11, it is preferable that specific numbers be displayed in a column of the comparison data R1 so as to be close to the object H, since it is easy to understand the length magnification A. That is, an image of comparison data is displayed by being copied, and mass as a material body is easy to know. First, since an environment in which the object H is photographed, and an environment in which the comparison data is photographed, that is, a photographing distance, a resolution, or the like, is different, it is necessary to correct mismatch between the length of the object image and the length of the comparison data image.

That is, when the height of a human of which a vertical resolution is 100 [pixel] is 1.6 [m] in the object image, mismatch in which an apple of which a vertical resolution is 100 [pixel] becomes the length of 0.05 [m] is corrected in the comparison data image. When the object image (human) and the comparison data image (apple) are combined without any change, the images are expressed in the same resolution, regardless of the difference in length between the human and the apple. Therefore, a resolution of the comparison data is changed according to the length and the resolution of the object. Specifically, when the length of the comparison data is $L_c$, and the vertical resolution of the comparison data image is $h_c$, if the length of the object is set to $L_o$, and the vertical resolution of the object image is set to $h_o$, the following expression is used in order to make the length of the comparison data image and the length of the object image match each other.

[Equation 5]

$$C = \frac{L_c h_o}{L_o h_c} \quad (5)$$

The comparison data image is enlarged by C times, and is combined with the object image. That is, the resolution of the comparison data is changed so that the length of the object and the length of the comparison data match each other. In the above described example, when a human of 100 [pixel] is 1.6 [m] high, a resolution of an apple of 0.05 [m] is adjusted so as to be a vertical resolution of 3 [pixel]. In addition, 32 images of comparison data (apple) after being subjected to the change in resolution are copied, and are aligned so as not to overlap with each other in the vertical direction.

Figure 12:
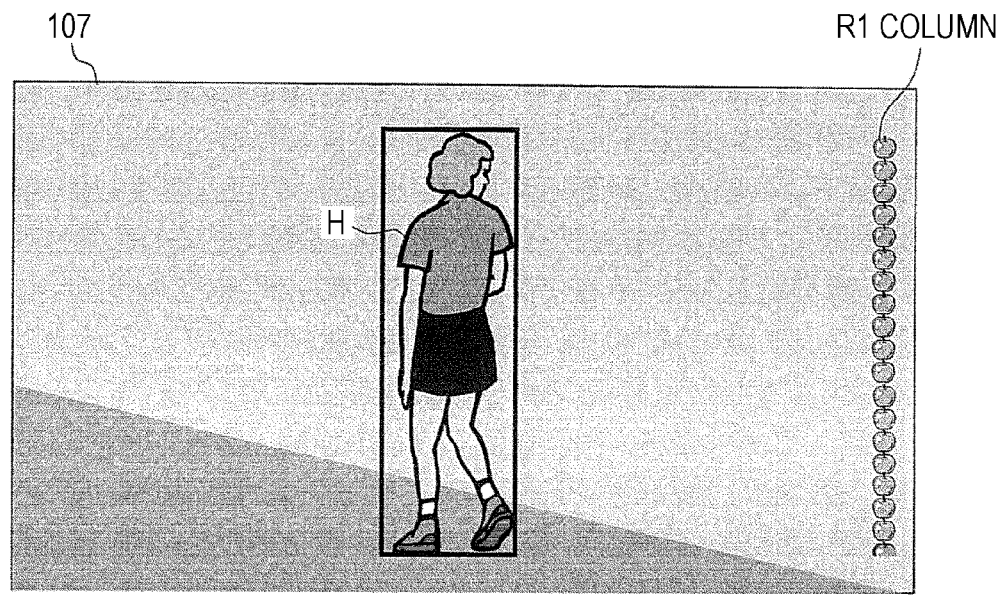
FIG. 12 is a diagram which describes a position displaying the length of an object using the length of comparison data.
Figure 13:
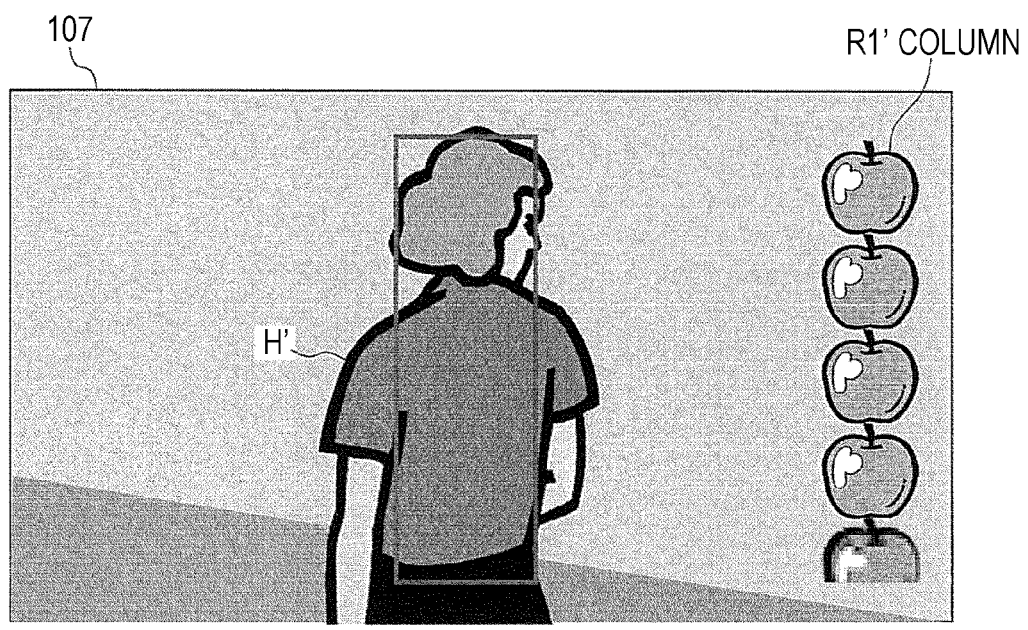
FIG. 13 is a diagram which describes a change in resolution of comparison data when a positional relationship between an object and the capturing device is changed.

At this time, a position of displaying the R1 column may be displayed so as to be close to the object as illustrated in FIG. 11, or may be displayed at an end of a screen as illustrated in FIG. 12. Since the length of the object included in the frame is changed (H'), when a positional relationship between the object and the image capturing device is changed in a state in which the frame in the screen is fixed, it is set such that a user can easily grasp the length of the object included in the frame by changing a resolution of the comparison data (R1' column) as illustrated in FIG. 13. In addition, in order to express a rough length, when it is "the same length as A and a half", an image which is cut out so as to be the length of A, and a half of A is displayed.

When it is an apple, this denotes a state in which only an upper half, or a lower half is illustrated. Here, it is preferable to set such that a comparison data image which is cut out according to the length magnification, and a comparison data image which is displayed using length magnification of 1 can be switched, when displaying comparison data of which length magnification A is equal to or less than 1, since it is easy for a user to grasp the comparison data. For example, when an object is an apple, and comparison data is a human, if the comparison data is cut out according to length magnification, only a foot of the human is displayed besides the apple. Therefore, it is possible to make the comparison data be easily grasped by displaying the comparison data using the length magnification of 1, that is, by displaying the whole body of the human. The image composition unit 106 outputs the image in which the comparison data image is combined with the left eye image based on the length magnification A using the above described processing to the display unit 107.

In the display unit 107, the image which is output from the image composition unit 106 is displayed on the display unit.

According to the embodiment, a method in which the left eye image is divided into windows of a small area, that is, into templates in the parallax calculation unit 102, and a corresponding position on the right eye image is retrieved with respect to each window is used, however, it is also possible to obtain the same effect when adopting a method using a graph cut, an expansion and contraction collation method, a method of searching corresponding point using energy minimization, or the like. In addition, the parallax is calculated based on the left eye image, however, the parallax may be calculated based on the right eye image.

In the embodiment, two capturing units are provided, however, it may be a configuration in which at least one capturing unit, and at least one light source generation unit are provided. That is, it is possible to obtain the same effect by calculating the length using distance information instead of the parallax information, by irradiating an object with a specific pattern using a light source such as visible light or infrared light, and analyzing the distance information from distortion of the pattern, or light intensity.

According to the embodiment, an object is extracted from an image which is photographed by the image capturing unit 101, and the object image and the length are maintained in the comparison data maintaining unit 105, however, it is possible to obtain the same effect, even when a database in which a plurality of comparison data and the length are maintained is obtained through a network, a package media, or the like, and is maintained in the comparison data maintaining unit 105.

According to the embodiment, a frame for extracting an object in the object extraction unit 103 is expressed as a rectangle, however, it is possible to obtain the same effect when the frame is a circle, a polygon, or a free form.

According to the embodiment, length magnification is calculated after selecting comparison data in the object comparison unit 104, however, the length magnification may be calculated in advance with respect to all the comparison data. In this case, a calculation amount of calculating the length magnification increases, and a memory region for maintaining the length magnification is necessary, however, since it is possible to obtain an effect after image composition in a case of comparison data of which length magnification is equal to or greater than 1, there is an advantage in that it is possible to know information of length magnification when a user selects the comparison data. That is, it is preferable that comparison data of which length magnification is equal to or greater than 1 be displayed as a comparison data candidate, and order of comparison data which is less than 1 be set to be low when being displayed as the comparison data candidate, since it is possible for a user to easily select comparison data which is easy to know when comparing the object and the comparison data.

According to the embodiment, the length in the vertical direction of the object is calculated in the object comparison unit 104, however, it is possible to similarly calculate the length in the horizontal direction. In this case, it is possible to calculate the length in the horizontal direction of the object using expressions (2) and (3), by changing the vertical angle of view $\theta$ of the camera parameters to horizontal angle of view $\theta h$, the vertical resolution h to a horizontal resolution w, and the number of pixels ho in the y axis direction of the object to the number of pixels h in the x axis direction of the object.

As described above, in the image capturing device according to the embodiment, it is possible for a user to easily compare the length of the displayed object, by converting the length of the photographed object into the length of the comparison data, and displaying the length.

In the above described embodiment, the configuration which is illustrated in accompanying drawings, or the like, is not limited to this, and can be appropriately changed in a range exerting the effect of the present invention. In addition, the embodiment can be executed by being appropriately changed without departing from the scope of the invention.

In addition, each constituent element of the invention can be arbitrarily selected, and an invention which includes the selected configuration is also included in the invention.

In addition, processing in each unit may be performed by recording a program for executing functions which are described in the embodiment in a computer-readable recording medium, causing a computer system to read the program which is recorded in the recording medium, and executing the program. In addition, here, the "computer system" includes hardware such as an OS, or a peripheral device.

In addition, the "computer system" also includes a homepage providing environment (or display environment) when using a WWW system.

In addition, the "computer-readable recording medium" is a portable medium such as a flexible disk, a magneto-optical disc, a ROM, a CD-ROM, and a storage device such as a hard disk which is embedded in the computer system. In addition, the "computer-readable recording medium" includes a medium which dynamically maintains a program for a short time, like a communication line when the program is transmitted through a communication line such as a network like the Internet, or a telephone line, and includes a medium which maintains the program for a certain time like a volatile memory in a computer system which becomes a server, or a client in such a case. In addition, the program may be a program for executing a part of the above described functions, and may be a program which can be executed in combination with a program in which the above described function is recorded in the computer system in advance. At least a part of the functions may be executed in hardware such as an integrated circuit.

INDUSTRIAL APPLICABILITY

The present invention can be used in an image capturing device.

REFERENCE SIGNS LIST

100 IMAGE CAPTURING DEVICE
101 IMAGE CAPTURING UNIT
102 PARALLAX CALCULATION UNIT
103: OBJECT EXTRACTION UNIT
104: OBJECT COMPARISON UNIT
104-1: DATA OBTAINING UNIT
104-2: LENGTH CALCULATION UNIT
104-3: IMAGE/LENGTH MAINTAINING UNIT
104-4: COMPARISON DATA LENGTH RATIO CALCULATION UNIT
104-5: IMAGE/LENGTH RATIO OUTPUT UNIT
105: COMPARISON DATA MAINTAINING UNIT

106: IMAGE COMPOSITION UNIT
107: DISPLAY UNIT

The invention claimed is:

1. An image capturing device that displays a length of an object based on a first image in which the object is photographed and parallax information corresponding to the first image, the image capturing device comprising:
   a length calculation circuit that calculates the length of the object;
   an object comparison circuit that calculates, as a length magnification A, a ratio of the length of the object to a length of a comparison object that is compared with the object; and
   an image composition circuit that combines the first image with a second image to generate a third image and outputs the third image; wherein
   the second image is formed by converting a fourth image of the comparison object based on the length magnification A calculated by the object comparison circuit;
   the image composition circuit combines the first image with a fifth image to generate a sixth image and outputs the sixth image; and
   the fifth image displays that the length of the object is A times the length of the comparison object.

2. An image capturing device that displays a length of an object based on a first image in which the object is photographed and parallax information corresponding to the first image, the image capturing device comprising:
   a length calculation circuit that calculates the length of the object;
   an object comparison circuit that calculates, as a length magnification A, a ratio of the length of the object to a length of a comparison object that is compared with the object; and
   an image composition circuit that combines the first image with characters to generate a second image and outputs the second image; wherein
   the characters display that the length of the object is A times the length of the comparison object.

3. The image capturing device as set forth in claim 2, wherein:
   the image composition circuit combines the first image with a third image to generate a fourth image and outputs the fourth image; and
   the third image is formed by converting a fifth image of the comparison object based on the length magnification A calculated by the object comparison circuit.

4. An image display method performed by an image capturing device that displays a length of an object based on a first image in which the object is photographed and parallax information corresponding to the first image, the image display method comprising:
   a length calculation step in which the length of the object is calculated;
   an object comparison step in which a ratio of the length of the object to a length of a comparison object that is compared with the object is calculated as a length magnification A; and
   an image composition step in which the first image is combined with a second image to generate a third image and the third image is output; wherein
   the second image is formed by converting a fourth image of the comparison object based on the length magnification A;
   in the image composition step, the first image is combined with a fifth image to generate a sixth image and the sixth image is output; and
   the fifth image displays that the length of the object is A times the length of the comparison object.

5. An image display method performed by an image capturing device that displays a length of an object based on a first image in which the object is photographed and parallax information corresponding to the first image, the image display method comprising:
   a length calculation step in which the length of the object is calculated;
   an object comparison step in which a ratio of the length of the object to a length of a comparison object that is compared with the object is calculated as a length magnification A; and
   an image composition step in which the first image is combined with characters to generate a second image and the second image is output; wherein
   the characters display that the length of the object is A times the length of the comparison object.

6. The image capturing device as set forth in claim 5, wherein:
   in the image composition step, the first image is combined with a third image to generate a fourth image and the fourth image is output; and
   the third image is formed by converting a fifth image of the comparison object based on the length magnification A calculated in the object comparison step.

7. A non-transitory computer-readable recording medium in which a program that causes a computer to execute the image display method according to claim 4 is recorded.

8. A non-transitory computer-readable recording medium in which a program that causes a computer to execute the image display method according to claim 5 is recorded.

* * * * *